Feb. 11, 1941.         G. D. SCOTT         2,231,511
TOOL RETRACTING MECHANISM
Filed May 24, 1939         3 Sheets-Sheet 1

Inventor:
GHERALD D. SCOTT
By Geo. H. Kennedy Jr.
Attorney

Inventor:
GHERALD D. SCOTT

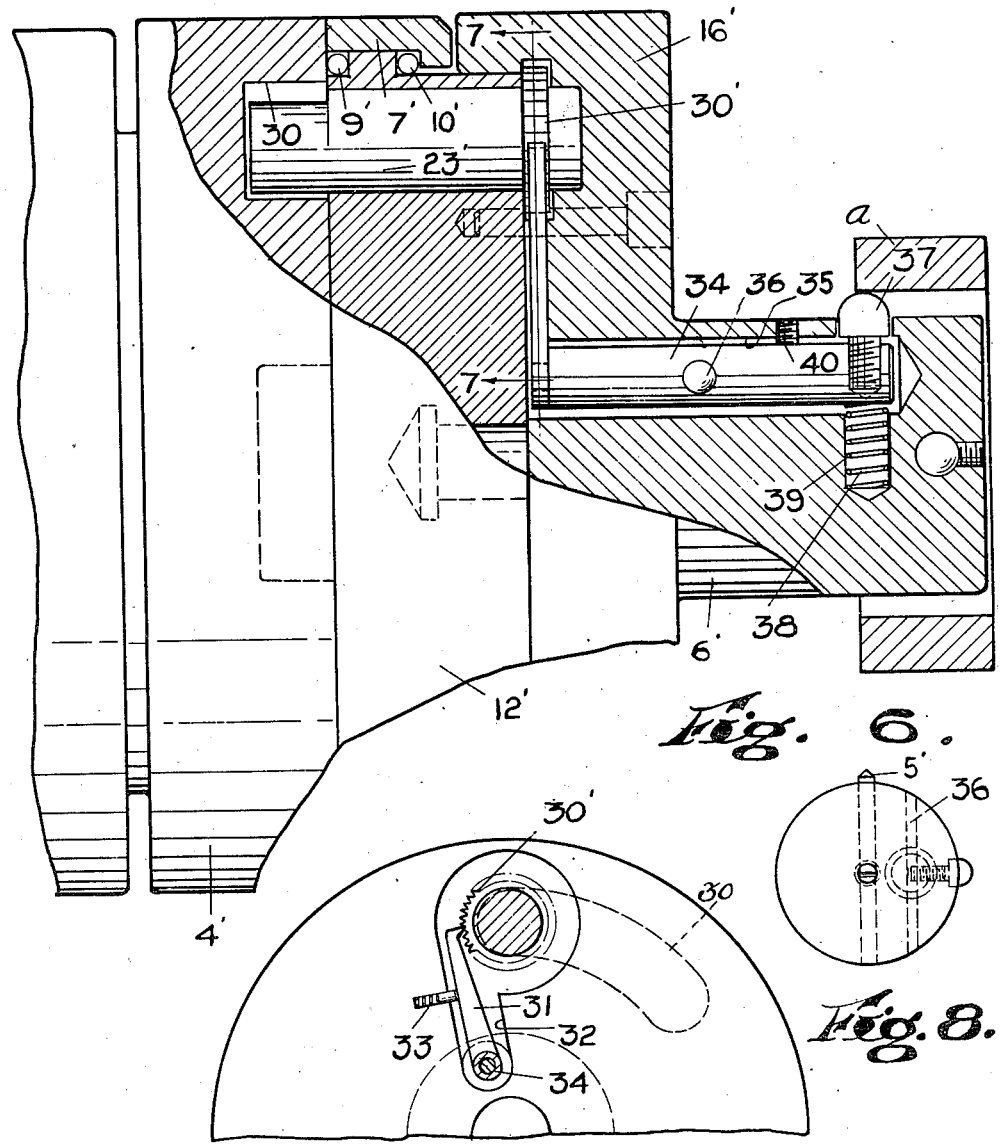

Patented Feb. 11, 1941

2,231,511

UNITED STATES PATENT OFFICE 2,231,511

TOOL RETRACTING MECHANISM

Gherald D. Scott, Worcester, Mass., assignor to The Heald Machine Company, Worcester, Mass., a corporation of Massachusetts Application May 24, 1939, Serial No. 275,495

11 Claims. (Cl. 77—3)

The present invention relates to tool heads and primarily to a tool retracting mechanism adapted to be mounted on a boring tool head which will provide for a retraction of the tool radially at the end of each boring operation.

In order to avoid the formation of grooves in the bored surface of a workpiece during the withdrawal of the tool from within the workpiece bore it has been found desirable to provide a mechanism for retracting the tool radially at the end of the boring operation and prior to the withdrawal of the tool from the workpiece. In prior devices of this character the tool retraction has been procured by stopping spindle rotation, as shown for instance, in the Schmidt Patent No. 2,058,359, dated October 20, 1936, in which the retraction of the tool is effected by resilient means and the tool is positioned for boring under the influence of centrifugal force. These devices are in general satisfactory, but the desired result is naturally a tool head which will provide for the tool retraction by an extremely simple structure.

The boring tool may also be retracted radially by utilizing the inertia of a part of the boring tool spindle which becomes operative upon stopping of the spindle rotation for moving the tool radially toward the axis of the spindle. A mechanism of this character is shown, for example, in the Schmidt Patent No. 2,058,360, dated October 20, 1936, in which the stopping, or the reversal of the rotation of the spindle provides for the tool retraction. One of the principal objects of the present invention is to provide, in an inertia-controlled tool of this general character, for adjusting the operative position of the tool so that the tool may be precisely located with respect to the axis of the spindle for accurate boring operations.

After a boring tool has been utilized for a period the cutting point of the tool is frequently worn away by a slight amount which necessitates adjustment of the tool in order that the workpieces may all be finished to the same predetermined diameter within the required limits. A machine in which there is an automatic compensation for the wear on the point of the boring tool is disclosed in the Blood Reissue Patent No. 20,634, dated January 25, 1938. This machine utilizes a gage which operates through electrically-controlled means for adjusting the position of the tool when a workpiece is not bored to the proper dimension. Another object of the present invention is to provide a device for compensating for the tool wear which will form a part of the tool head and will adjust the position of the cutting point of the boring tool if a workpiece is not bored to the desired dimension.

Other and further objects and advantages of the invention will appear from the following detailed description taken in connection with the accompanying drawings in which—

Fig. 6 is a sectional view similar to Fig. 2, showing a modification.

Fig. 7 is a sectional view along the line 7—7 of Fig. 6.

Fig. 8 is an end view of the tool spindle.

Figure 1:
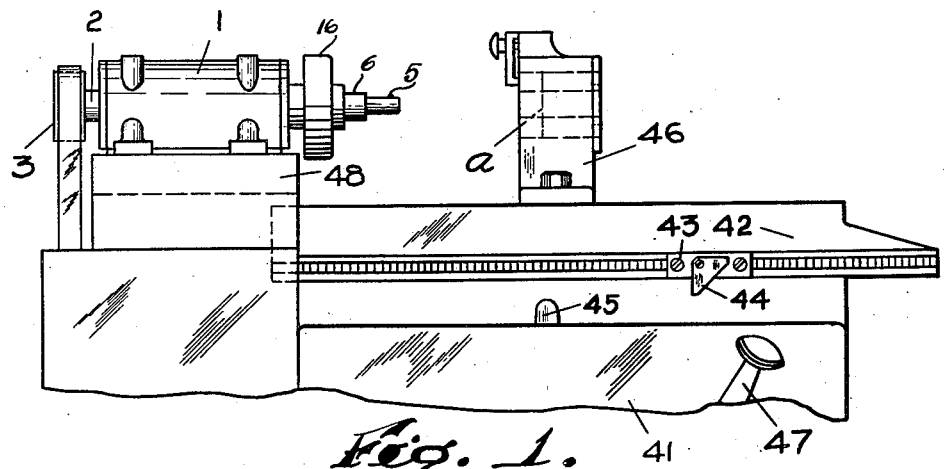
Fig. 1 is a front elevation of a machine to which the invention is applicable.
Figure 2:
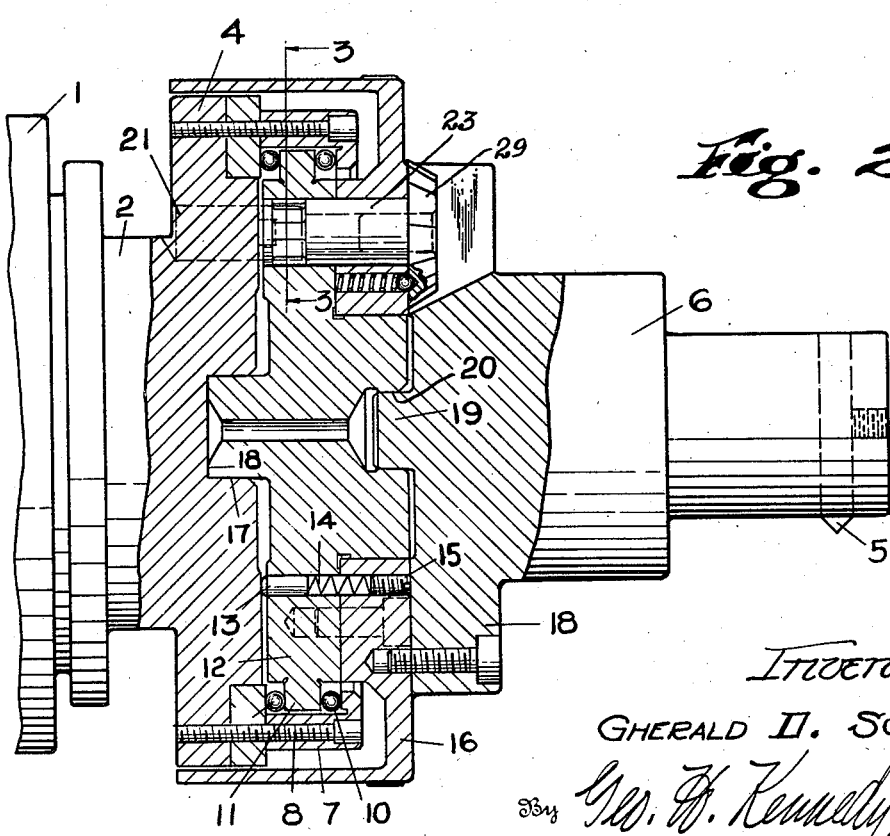
Fig. 2 is a side elevation of the tool head, of my invention, with the tool retracting mechanism in section.

Referring first to Fig. 2, the tool head comprises a housing 1 having a spindle 2 journalled therein. Suitable bearings, not shown, are provided for assuring a vibrationless rotation of the spindle within the housing. A pulley 3, Fig. 1, on one end of the spindle provides for the rotation thereof and the other end of the spindle has a face plate 4 on which is mounted the boring tool 5, a supporting quill 6, and the tool retracting mechanism hereinafter described in detail.

The face plate 4 has a bearing ring 7 mounted thereon, as by clamping bolts 8, and this bearing ring supports sets of ball bearings 9 and 10 between which is positioned the peripheral flange 11 of an inertia member 12. The bearings provide for free rotation of the inertia member relative to the face plate as it is this inertia member which provides for the retraction of the tool. A frictional drag member 13, positioned in the inertia member 12 and engaging the face plate 4, provides the desired braking action between the inertia member and the face plate. The member 13 is held against the face plate 4 by means of a spring 14, the pressure of said spring being suitably adjusted by means of a screw 15 carried by a cap 16 which is fastened to the inertia member.

The face plate has a central opening 17 to receive an integral stud 18 on the inertia member. This stud is eccentric to the inertia member to such a degree that a turning of the inertia member on the face plate will provide for a retraction of the boring tool, as will hereinafter appear, but will not affect the functioning of the ball bearings which support the inertia member. It will be understood that the cap 16, as well as the quill 6, being mounted on the inertia member, form a functionally integral part thereof, so that the inertia of these several elements is available for the shifting of the position of the tool.

The supporting quill 6 for the boring tool which extends radially from the end of the quill has a flange 18 by which the quill is secured to the cap and inertia member. As shown, the quill has a centrally extending stud 19 engageable with a bore 20 in the inertia member for accurately locating the quill. The stud may be slightly eccentric so that angular adjustment of the quill on the cap will provide for adjustment of the radial position of the cutting point of the boring tool. Preferably, however, the stud is concentric to the quill and fits in an opening in the inertia member which is concentric to the axis of the boring spindle.

Figure 3:
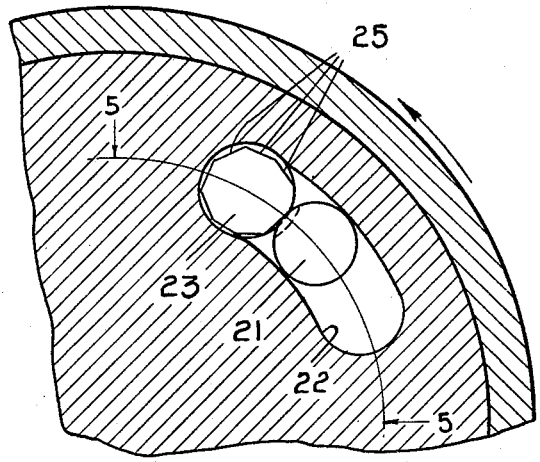
Fig. 3 is a sectional view substantially along the line 3—3 of Fig. 2.
Figure 4:
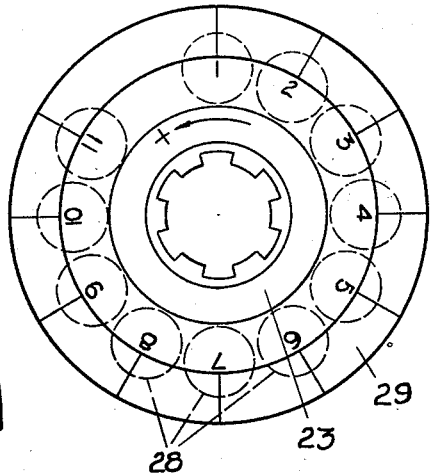
Fig. 4 is a fragmentary elevation showing a detail.
Figure 5:
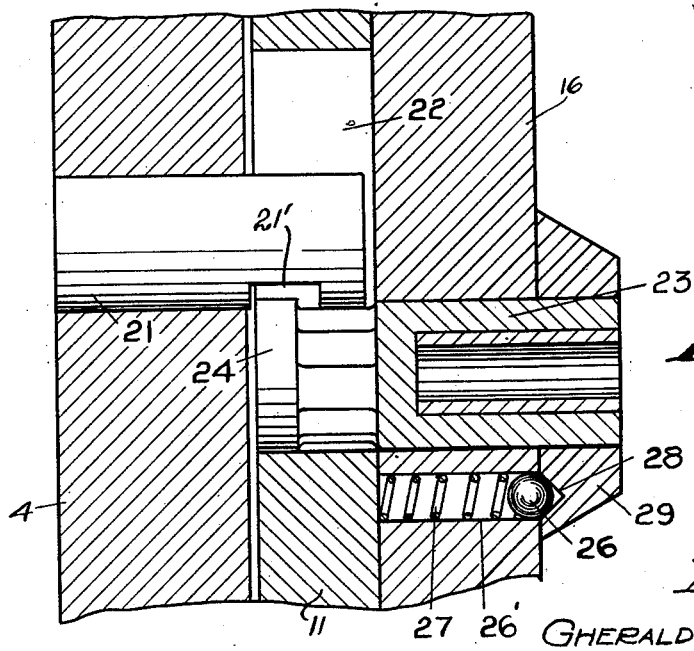
Fig. 5 is a sectional view along the line 5—5 of Fig. 3.

For limiting the angular movement of the inertia member and thereby determining the operative position of the tool, the face plate 4 has a pin 21, Figs. 3 and 5, projecting therefrom and movable in a slot 22 in the inertia member. The cap 16 carries a turnable pin 23 extending into slot 22 of the inertia member, and a portion of the inner end of this pin 23 is in a position to be engaged by the pin 21 when the inertia member is moved relative to the face plate to place the boring tool in operative position. In order to provide a rigid support for the pin 23, the inner end thereof provides a bearing surface 24, the pin 21 being notched at 21' to clear said bearing surface.

The portion of the pin 23 which is engageable by the pin 21 is provided with a plurality of flat surfaces 25 the spacing of which, from the center of the pin, varies gradually with each successive flat surface, as best shown in Fig. 3, and thus the operative position of the boring tool may be adjusted slightly by turning of the pin within the cap. The flat surfaces are so proportioned that if the pin is turned to position an adjacent surface in alinement with the pin 21, the effective radial movement for the end of the boring tool is a predetermined small amount, as, for example, one ten-thousandth of an inch.

In order that these flat surfaces may be properly located with respect to the pin 21, the cap has a ball 26 slidable in a small bore 26' in the cap and resiliently urged by a spring 27 into conical recesses 28 in the underside of a collar 29 secured to the outer end of the pin 23. The conical recesses are angularly spaced in accordance with the spacing of the flat surfaces, as will be apparent. By this arrangement, the turning of the pin 23 to position an adjacent flat surface in alinement with the pin 21, will advance the cutting point of the boring tool radially an amount sufficient to compensate for the amount of wear on the tool and to make sure that the tool is accurately advanced a fixed amount. The outer end of the pin 23 is recessed to receive a suitable wrench, not shown, by which said pin may be turned.

In operation, when the spindle is set in rotation in a counterclockwise direction, Fig. 3, the inertia of the inertia member, cap and quill will cause a movement of these elements on the face plate to bring the pin 21 into engagement with the limiting pin 23, thereby positioning the boring tool in operative boring position. When the spindle is stopped, as by utilizing a conventional brake mechanism to stop the spindle rotation quickly, the inertia of the above elements will cause a turning of the elements relative to the face plate, thereby moving the stop pin 21 away from the limiting pin 23. Since the inertia member is slightly eccentric on the face plate, it is obvious that this turning movement will result in a movement of the cutting point of the boring tool radially inward toward the spindle axis for retracting the tool from operative boring position.

When the cutting point of the boring tool is worn away to such an amount as to require adjustment of the tool, this adjustment is effected by turning the limiting pin 23 through such an angle as to bring the adjacent flat surface into alinement with the stop pin. As above stated, the adjacent flat surfaces engageable with the pin 21 are so proportioned as to assure a predetermined amount of radial advance of the boring tool for each step around the limiting pin 23.

Adjustment of the boring tool as above described is effected manually and if this adjustment is used for compensating for wear on the cutting point of the tool it is necessary to check the bored sizes of successive pieces of work to ascertain when adjustment of the boring tool is necessary. In the structure of Figs. 6 to 8 inclusive, adjustment of the boring tool to compensate for wear thereon is procured automatically, thereby assuring accurate finishing of successive workpieces all to the same predetermined dimension independently of wear on the boring tool.

With reference to these figures, the face plate 4' has a bearing ring 7' which, in conjunction with the face plate, supports sets of ball bearings 9' and 10' which provide for substantially free turning movement of an inertia member 12'. A cap 16' is bolted to the inertia member and functions as an integral part thereof. A supporting quill 6' is integral with the cap, as shown, and carries a radially extending tool 5'.

In this arrangement the face plate has a slot 30 to receive the end of a pin 23' which extends through the inertia member 12', and which is turnable in said inertia member and in the cap 16', for limiting the angular movement of the inertia member. The portion of the pin 23' which is engageable with the slot is eccentric to the axis of the pin, as shown. Thus, a slight turning of the pin 23' will provide for a radial adjustment of the operative position of the point of the boring tool with respect to the axis of the spindle.

The pin 23' is provided with a ratchet wheel 30' in a position for engagement with a pawl 31 positioned in a recess 32 in the cap and being held by a spring 33 in engagement with the ratchet wheel. The pawl is carried on the end of an arm 34 positioned in a bore 35 in the quill and cap. The arm is rockable on a pin 36 and the end of the arm remote from the pawl has a projecting feeler 37 which extends beyond the surface of the quill, as shown, and is urged outwardly by a coil spring 38 in a recess 39 in the quill. An adjustable screw 40 limits the outward movement of the feeler so that this feeler extends beyond the periphery of the quill an amount such that the distance from the axis of rotation of the quill to the end of the feeler shall be exactly the radius of the finished surface of the workpiece. As shown in Fig. 6, the feeler is positioned to extend from the quill in such a manner that the slight turning movement of the inertia member and the quill will affect the radial position of the feeler to the smallest extent possible. Thus, with the boring tool extending from the quill so that the greatest amount of back-off may be obtained by a small amount of turning movement of the inertia member and quill relative to the face plate, the feeler will project from the quill at right angles to the direction that the boring tool projects.

Referring now to Fig. 1, the tool head is shown as mounted on a machine which provides for the starting and stopping of the boring spindle necessary to provide for the retraction of the boring tool from operative position. The machine has a base 41 on which is mounted, for reciprocation, a table 42. The table has a block 43 secured thereto from which depends a dog 44 engageable with a reversing lever 45 by which the movement of the table is automatically reversed after the boring tool has passed entirely through the bore of the workpiece a mounted in a workholder 46. A reversing lever 47 provides for manual control of the table movements. Any suitable table shifting mechanism may be utilized, as will be apparent.

The tool head is mounted on a bridge 48 which extends over the table and the rotation of the boring tool is preferably controlled by a suitable fluid pressure actuated clutch and brake mechanism, the movements of which are under the control of the same reversing lever 45 that controls the movements of the table. Thus, with an automatic stopping and starting of the boring tool, it is apparent that the quill 6 and inertia member 12 are turned slightly clockwise relative to the face plate 4 to provide for a retraction of the tool upon cessation of rotation of the tool spindle or advance of the tool as the spindle begins to rotate.

In operation, when the boring tool is worn away to such an extent that the feeler is pushed inwardly of the quill by the workpiece as the quill advances through the workpiece, the pawl is actuated to feed the ratchet one step, thereby causing the inertia member to assume a slightly different operative position relative to the face plate which will cause the tool to be advanced radially to the precise position from the axis of the spindle necessary for boring the predetermined dimension. The engagement between the pin 23, and the end of the slot in the face plate determines the operative position of the boring tool. It will be understood that the automatic radial advance of the point of the boring tool does not in any way affect the retraction of the boring tool at the end of each boring operation, or its advance into operative position at the beginning of each boring operation. Since the position of the feeler radially of the axis of the spindle is practically unaffected by the change in the operative position of the boring tool, resulting from the action of the pawl and ratchet, it will be understood that the feeler and its associated mechanism acts to accurately adjust the position of the point of the boring tool when the latter is worn down so that the finished bore of the workpiece is no longer the predetermined dimension. This predetermined dimension of a workpiece is controlled by the radial position of the feeler with respect to the axis of the spindle on which the tool structure is mounted. In the disclosure of Fig. 6, the feeler is shown in a position to engage the bore of the workpiece a without being moved inwardly by the workpiece to cause an adjustment of the operative position of the boring tool.

I claim:

1. In a tool head, a spindle, a member mounted on the spindle in eccentric relation to the spindle axis and turnable relative to the spindle, a tool carried by said member, and adjustable means for limiting the turning movement of said member in one direction for controlling the operative position of the tool, said limiting means including a pin having a plurality of surfaces thereon, each of which is spaced a predetermined amount from the axis of the pin for determining the amount that the tool projects radially of the spindle axis.

2. In a tool head, a spindle, a member mounted on the spindle in eccentric relation to the spindle axis and turnable relative to the spindle, a tool carried by said member, a stop pin in the spindle and a cooperating limiting pin carried by the member, one of said pins having a plurality of stepped surfaces and being angularly adjustable to provide for adjustment of the operative position of the tool.

3. In a tool head, a spindle, a member mounted on the spindle in eccentric relation to the spindle axis and turnable relative to the spindle, a tool carried by said member, a stop pin in the spindle and a cooperating limiting pin carried by the member, one of said pins having a plurality of stepped surfaces and being angularly adjustable to provide for adjustment of the operative position of the tool, said pin with the stepped surfaces being positioned in said member.

4. In a tool head, a spindle, a member mounted on the spindle in eccentric relation to the spindle axis and turnable relative to the spindle, a tool carried by said member, a stop pin in the spindle and a cooperating limiting pin carried by the member, one of said pins having a plurality of stepped surfaces and being angularly adjustable to provide for adjustment of the operative position of the tool, and means accessible externally of the member for adjusting the angular position of the stepped pin.

5. In a tool head, a spindle member, an inertia member eccentrically mounted on said spindle, a tool carried by said inertia member and adjustable radially of the spindle axis by turning of said inertia member relative to the spindle, and a pin positioned in one of said members in substantially parallel relation to the spindle axis for limiting the relative movement of the members in one direction, said pin having limiting means thereon at varying distances from the axis of the pin for adjusting the relative position of said members for varying the operative position of the boring tool.

6. In a tool head, a spindle member, an inertia member eccentrically mounted on said spindle, a tool carried by said inertia member and adjustable radially of the spindle axis by turning of said inertia member relative to the spindle, a pin positioned in one of said members for limiting the relative movement of the members in one direction, said pin having means thereon for adjusting the relative position of said members for varying the operative position of the boring tool, and a feeler carried by the inertia member and adapted to provide for turning of said pin when a workpiece is not finished to the desired dimension.

7. In a tool head, a spindle member, an inertia member eccentrically mounted on said spindle, a tool carried by said inertia member and adjustable radially of the spindle axis by turning of said inertia member relative to the spindle, a pin positioned in one of said members for limiting the relative movement of the members in one direction, said pin having means thereon for adjusting the relative position of said members for varying the operative position of the boring tool, a feeler carried by the inertia member in substantially the same spaced relation to the axis of the spindle member as the point of the tool, and means actuated by the feeler for turning the pin if the workpiece is not finished to the predetermined dimension by the boring tool.

8. In a tool head, a spindle member, an inertia member eccentrically mounted on said spindle, a tool carried by said inertia member and adjustable radially of the spindle axis by turning of said inertia member relative to the spindle, a pin positioned in one of said members for limiting the relative movement of the members in one direction, said pin having means thereon for adjusting the relative position of said members for varying the operative position of the boring tool, a feeler carried by said inertia member and movable relative to the axis of the spindle member, and means responsive to radially inward movement of the feeler for turning the pin.

9. In a tool head, a spindle, a member mounted on the spindle in eccentric relation to the spindle axis and turnable relative to the spindle, a tool carried by said member, adjustable means for limiting the movement of the member relative to the spindle in one direction for determining the operative position of the tool, a feeler carried by said member and engageable with the surface of the workpiece engageable by the tool, and means under the control of said feeler for adjusting the position of said limiting means.

10. In a tool head, a spindle member, a tool carrying member mounted on the spindle member in eccentric relation to the spindle axis and turnable relative to the spindle member, a tool carried by said tool carrying member, a limiting pin carried by one of said members in substantially parallel relation to the spindle axis and engageable laterally with a part of the other member for limiting the relative turning movement between said members, said pin at the portion engageable with the other member having integral limiting means at varying distances from the axis of the pin for varying the operative position of the tool by varying the amount of relative turning movement between the members.

11. In a tool head, a spindle member, a tool carrying member mounted on the spindle member in eccentric relation to the spindle axis and turnable relative to the spindle member, a tool carried by said tool carrying member, a limiting pin carried by one of said members in substantially parallel relation to the spindle axis and engageable laterally with a part of the other member for limiting the relative turning movement between said members, said pin at the portion engageable with the other member having integral limiting means at varying distances from the axis of the pin for varying the operative position of the tool by varying the amount of relative turning movement between the members, and means accessible externally of the members for adjusting the angular position of the pin.

GHERALD D. SCOTT.